(12) United States Patent
Nishikawa

(10) Patent No.: US 6,486,968 B2
(45) Date of Patent: Nov. 26, 2002

(54) OUTPUT CONTROL METHOD AND APPARATUS

(75) Inventor: Yoko Nishikawa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/086,458

(22) Filed: May 29, 1998
Prior Publication Data
US 2002/0048039 A1 Apr. 25, 2002

(30) Foreign Application Priority Data

Jun. 3, 1997 (JP) .............................................. 9-145153

(51) Int. Cl.$^7$ .............................................. G06F 15/00
(52) U.S. Cl. ...................... 358/1.15; 358/1.14
(58) Field of Search ............................... 358/1.15, 1.14, 358/1.13, 1.18, 1.1, 407, 468, 1.17, 1.16, 1.2; 345/326, 335, 340, 348, 352

(56) References Cited

U.S. PATENT DOCUMENTS 5,706,411 A * 1/1998 McCormick et al. ...... 358/1.15
6,002,848 A * 12/1999 Takahashi .................. 358/1.17

FOREIGN PATENT DOCUMENTS

EP          0 575 168 A1 * 12/1993

\* cited by examiner

Primary Examiner—Gabriel Garcia
(74) Attorney, Agent, or Firm—Fitzpatrick, Cella, Harper & Scinto

(57) ABSTRACT

In an image forming apparatus for forming a visible image thereon, the apparatus informs a host computer of the timing of a paper delivery and the percentage value of the progress of the paper sheet delivery so that the animation representing the progress of the paper delivery is accurately presented on the host computer.

24 Claims, 16 Drawing Sheets

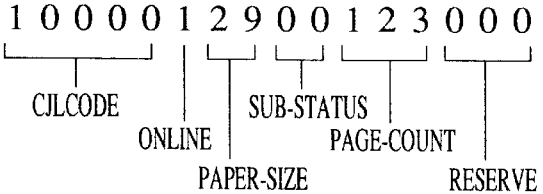

FIG. 6

CJLCODE

| STATUS CODE | CONTENT |
|---|---|
| 10000 | READY |
| 10020 | WARM-UP |
| 10400 | TEST PRINTING IN PROGRESS |
| 30060 | INSUFFICIENT MEMORY |
| 41000 | NO PAPER |
| 40020 | COVER OPENED |
| 40030 | PAPER JAMMED |

ONLINE

| VALUE | ONLINE | PRINTER STATUS |
|---|---|---|
| 1 (31h) | TRUE | ON-LINE |
| 0 (30h) | FALSE | OFF-LINE |

PAPER-SIZE

| NONE | 00 | EXECUTIVE | 26 |
|---|---|---|---|
| A4 | 29 | A5 | 21 |
| LETTER | 27 | UNIVERSAL | 35 |
| B4 | 36 | A3 | 42 |
| POSTCARD | 14 | LEISURE | 43 |
| B5 | 25 | ENVELOPE 4 | 23 |
| NINI | 14 | ENVELOPE 2 | 16 |
| LEGAL | 35 | | |

SUB-STATUS

| 00 | IDLING (ON-LINE READY) |
|---|---|
| 01 | RECEIVING DATA |
| 02 | PROCESSING DATA |
| 03 | PAPER FEED IN PROGRESS |
| 04 | PAPER FORWARD END DETECTED |
| 05~99 | PERCENTAGE (5%-99%) OF TIME ELAPSE IN DURATION FROM START TO END OF PAPER DELIVERY |

FIG. 7
MEMORY MAP OF STORAGE MEDIA SUCH AS FD, CD-ROM
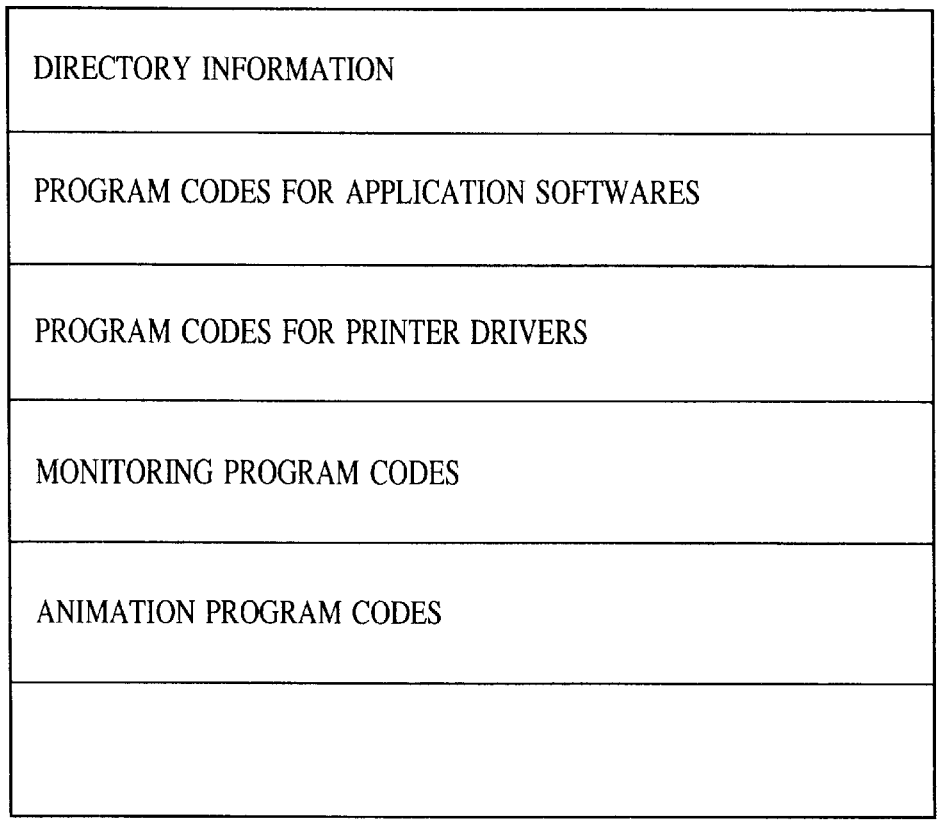
MEMORY MAP OF PRINTER CONTROLLER
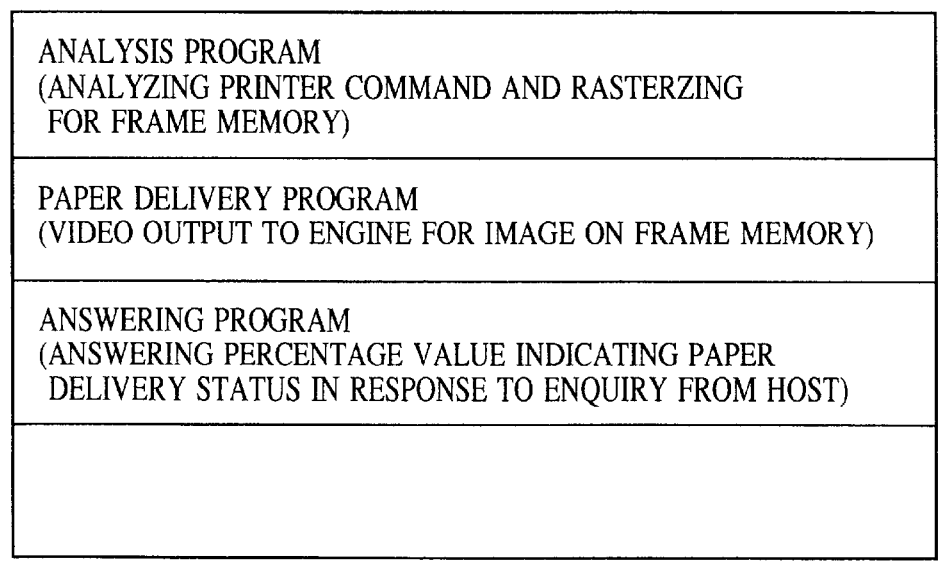

OUTPUT CONTROL METHOD AND APPARATUS

BACKGROUND OF THE INVENTION

1. Field of the Invention

The present invention relates to an output control method and apparatus for analyzing input information coming in from outside and forming a visible image.

2. Description of the Related Art

Conventional image forming apparatuses of a type like WPS (Windows Printing System) allow a host computer to execute part of processing job of print data. In a technique for indicating to a user a status of the apparatus, the apparatus starts its printing mechanism at the moment the apparatus itself is initiated, and displays an animation indicative of paper delivery on the host computer screen.

In an image forming apparatus of a type which receives PDL (page description language) language to form an image, its printing mechanism not necessarily starts its printing immediately when data of one page of sheet is sent to the image forming apparatus, because processing print data takes time. Depending on the processing capability of the image forming apparatus, all processing steps are in progress in the order of an expansion of the print data into a frame buffer, an initialization of the printing mechanism, a printing, and a paper deliver, and a host computer is unable to know the timing of the paper delivery.

SUMMARY OF THE INVENTION

According to the present invention, in an image forming apparatus, communicating means, for bilaterally communicating with a connected apparatus, bilaterally communicates information with the connected apparatus, setting means, for setting a communication mode, sets the timing and content of communication with the connected apparatus, storage means, for storing the communication mode set by the setting means, stores the timing and content of the communication with the connected apparatus, communicating means, for performing communication in accordance with the communication mode set by the setting means, communicates with the connected apparatus, detecting means, for detecting a change in the status of an image forming apparatus, detects the change in the status, converting means for converting the status detected by the detecting means into a format for communication, converts the change in status into the format for communication for the connected apparatus, data storage means, for storing data into which the converting means converts the status, stores the change in status for the connected apparatus, and transmitting means, for transmitting the data stored in the storage means, transmits the status of the image forming apparatus to the connected apparatus.

Furthermore in the image forming apparatus, storage means, for storing the information about a usable paper sheet, stores various pieces of information about the usable paper sheet, and detecting means, for detecting the position of each usable paper sheet under delivery, as detecting means for detecting a change in the status of the image forming apparatus, detects the delivery situation of the paper sheet. The apparatus, connected to the image forming apparatus, transmits image data to the image forming apparatus, performs bilateral communication with the image forming apparatus, and has displaying means for displaying an image. In the connected apparatus, receiving means, for receiving data transmitted by the image forming apparatus, receives the information about the status of the image forming apparatus, transmitted by the image forming apparatus, analyzing means, for analyzing the data received, analyzes the status of the image forming apparatus, storage means, for storing graphics and characters, representing the analysis result, stores an image for notifying a user of the status of the image forming apparatus, associating means, for associating the information analyzed by the analyzing means with the image stored in the storage means, selects the image representing the status of the image forming apparatus, and displaying means, for displaying the image selected by the associating means, presents the status of the image forming apparatus.

According to one aspect of the present invention, the output control apparatus preferably comprises communicating means for analyzing a command received from an external apparatus to form image data and for bilaterally communicating with an output apparatus, receiving means for receiving data that indicates that the status of the output apparatus changed, and control means for performing animation control based on the data received by the receiving means.

The animation control preferably controls the start or end of an animation. In the output control apparatus of the present invention, the output apparatus preferably comprises detecting means for detecting the position of each usable paper sheet under delivery, as detecting means for detecting the change in the status of the output apparatus, and controls an animation that simulates the transport of the paper sheet based on the information about the position of the paper sheet.

The output control apparatus of the present invention preferably comprises transmitting means, connected to the output apparatus, for transmitting image data to the output apparatus, displaying means for displaying characters and graphics, analyzing means for analyzing data received, storage means for storing graphics and characters, representing a analysis result, and associating means for associating the information analyzed by the analyzing means with an image stored in the storage means, wherein an image selected by the associating means is displayed by the displaying means.

The communicating means for bilateral communication preferably communicates a command for returning a status when a change in the status of the output apparatus takes place and a command for controlling the timing of the return of the status to the output control apparatus.

The animation control preferably controls the end of the animation depending on whether the paper sheet delivery in the output apparatus has been completed.

The transmission of the information indicating the change in the status of the output apparatus or the animation control is preferably commanded to be enabled or disabled.

The received command is preferably a page description language.

According to another aspect of the present invention, the output control method preferably comprises the communicating step for analyzing a command received from an external apparatus to form an image data and for bilaterally communicating with an output apparatus, and the animation control step for performing animation control based on data that indicates that the status of the output apparatus changed.

The animation control preferably controls the start or end of an animation.

The output apparatus preferably comprises detecting means for detecting the position of each usable paper sheet under delivery, as detecting means for detecting the change in the status of the output apparatus, and controls an animation that simulates the transport of the paper sheet based on the information about the position of the paper sheet.

The output control method preferably comprises the communicating step for communicating image data with the output apparatus, the displaying step for displaying characters and graphics, the analyzing step for analyzing data received, the storing step for storing graphics and characters representing the result of analysis, the associating step for associating the information analyzed in the analyzing step with an image stored in the storing step, wherein an image selected through the associating step is displayed in the displaying step.

The communicating step preferably communicates a command for returning a status when a change in the status of the output apparatus takes place and a command for controlling the timing of the return of the status.

The animation control preferably controls the end of the animation depending on whether the paper sheet delivery in the output apparatus has been completed.

The output control method preferably comprises the step of commanding to be enabled or disabled the information indicating the change in the status of the output apparatus or the animation control.

The received command is preferably a page description language.

According to anther aspect of the present invention, the storage medium preferably stores a program comprising the communicating step for analyzing a command received from an external apparatus to form an image data and for bilaterally communicating with an output apparatus, and the animation control step for performing animation control based on data that indicates that the status of the output apparatus changed.

The animation control preferably controls the start or end of an animation.

The output apparatus preferably comprises detecting means for detecting the position of each usable paper sheet under delivery, as detecting means for detecting the change in the status of the output apparatus, and controls an animation that simulate the transport of the paper sheet based on the information about the position of the paper sheet.

The storage medium preferably stores a program comprising the communicating step for communicating image data with the output apparatus, the displaying step for displaying characters and graphics, the analyzing step for analyzing data received, the storing step for storing graphics and characters representing the result of analysis, the associating step for associating the information analyzed in the analyzing step with an image stored in the storing step, wherein an image selected through the associating step is displayed in the displaying step.

The communicating step preferably communicates a command for returning a status when a change in the status of the output apparatus takes place and a command for controlling the timing of the return of the status.

The animation control preferably controls the end of the animation depending on whether the paper sheet delivery in the output apparatus has been completed.

The program preferably comprises the step of commanding to be enabled or disabled the transmission of the information indicating the change in the status of the output apparatus or the animation control.

The received command is preferably a page description language.

BRIEF DESCRIPTION OF THE DRAWINGS

FIG. 5 lists statuses in the process of the embodiment of the present invention;

FIG. 6 lists statuses in the process of the embodiment of the present invention;

FIG. 7 is a memory map of a storage medium that stores various data processing programs read by an image forming apparatus of the present invention and by an apparatus to which the image forming apparatus is connected;

DESCRIPTION OF THE PREFERRED EMBODIMENTS

First Embodiment

Figure 1:
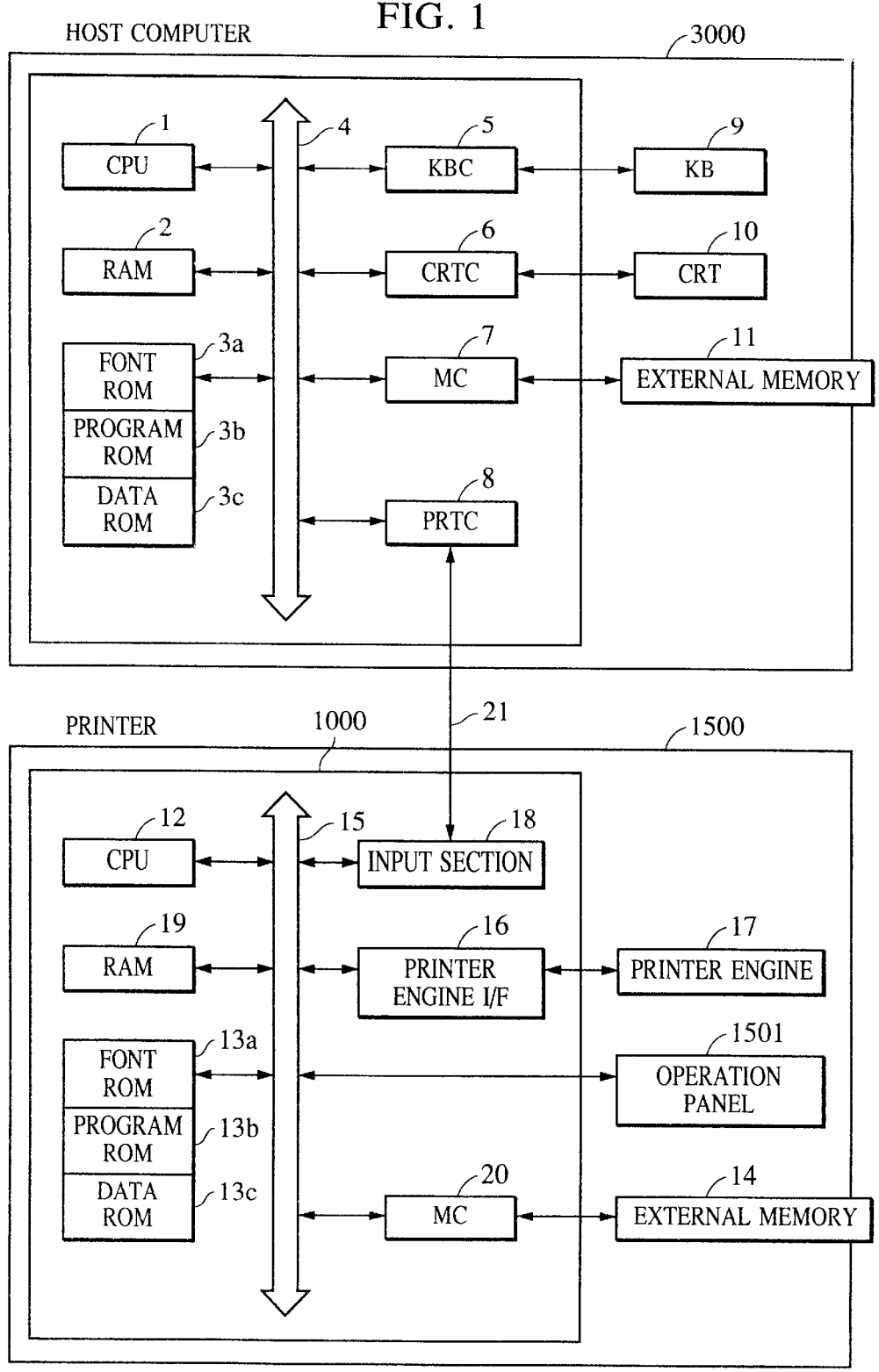
FIG. 1 is a block diagram showing the construction of one embodiment of the present invention.

FIG. 1 is a block diagram showing a first embodiment of a printer control system of the present invention. The printer control system here is for a laser beam printer. As long as the function of the present invention is accomplished, the present invention may be implemented in a standalone apparatus, a system constructed of a plurality of apparatuses, or a system in which a process is executed through a network such as a LAN. A host computer 3000 includes CPU 1 that processes a document in which graphics, an image, characters and tables (including spreadsheet) are mixed, under the control of a document processing program stored in a ROM 3, a program ROM, and generally controls the devices connected to a system bus 4.

A program ROM 3b of ROM 3 stores control programs and the like for CPU 1, and a font ROM 3a of ROM 3 stores font data used in the above document processing, and a data ROM 3c of ROM 3 stores a variety of data used in the above document processing. RAM 2 functions as a main memory and a working area for CPU 1. A keyboard controller (KBC) 5 controls a keyboard 9 and a key input from an unshown pointing device. A CRT controller (CRTC) 6 controls the display of a CRT display 10. A memory controller (MC) 7 controls an access to an external memory 11 such as a hard disk (HD) and a floppy disk (FD) storing a boot program, a diversity of applications, font data, user files and edit files. The external memory stores programs illustrated in flow diagrams in FIGS. 2 and 3. A printer controller (PRTC) 8 is connected to a printer main unit 1500 via a predetermined bidirectional interface 21, and executes communication control process with a printer control unit 1000. CPU 1 performs expansion (rasterizing) of outline fonts into a display information RAM set up in RAM 2, enabling a WYSIWYG display on CRT 10. CPU 1 opens a variety of registered windows in response to a command given by an unshown cursor of a mouse on CRT 10, carrying out a diversity of data processings.

The laser beam printer (LBP) main unit 1500 comprises an operation panel 1501 on which operation switches and LED display devices are arranged, and the printer control unit 1000 for controlling generally the entire LBP main unit 1500 and analyzing print information supplied by the host computer. In the printer control unit 1000, a printer CPU 12 generally controls the access to the devices connected to a system bus 15 under the control program or the like stored in a program ROM 13b of ROM 13 or the control program or the like stored in an external memory 14, and outputs an image signal as output information to a printer module (printer engine) 17 which is connected thereto via a printer interface 16. The program ROM 13b of ROM 13 stores the control program of CPU 12 as illustrated in a flow diagram shown in FIG. 4. A font ROM 13a of ROM 13 stores font data used in producing the output information, and a data ROM 13c of ROM 13 stores information used in the host computer when the printer has no external memory such as a hard disk. CPU 12 processes communication with the host computer via an input section 18, and is designed to report the information about the printer to the host computer 3000. RAM 19 functions as a main memory and a working area for CPU 12, and its memory capacity can be expanded by adding an optional RAM on an unshown expansion port. RAM 19 serves as an output information rasterize area, an environment data storage area, NVRAM (nonvolatile RAM) and the like. The access to the external memory 14 such as a hard disk and an IC card is controlled by a memory controller (MC) 20. The external memory 14 is optionally connected and stores font data, an emulation program and form data.

The external memory 14 includes at least one or more memory units, including an optional font card in addition to a built-in font, and a plurality of external memory units for storing programs that translate printer control languages of different language systems. The external memory 14 may include a NVRAM to store printer setting mode information set by a command from the host computer.

Figure 2:
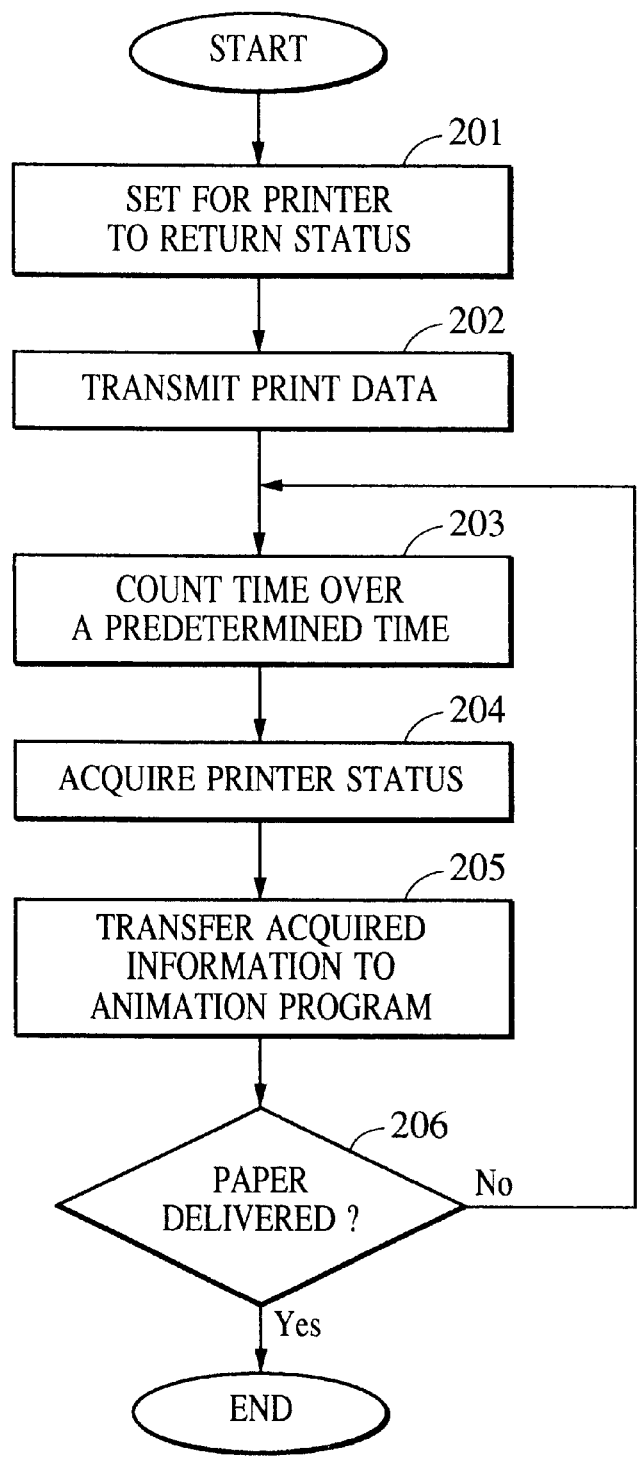
FIG. 2 is a flow diagram showing the process of the embodiment of the present invention.
Figure 3:
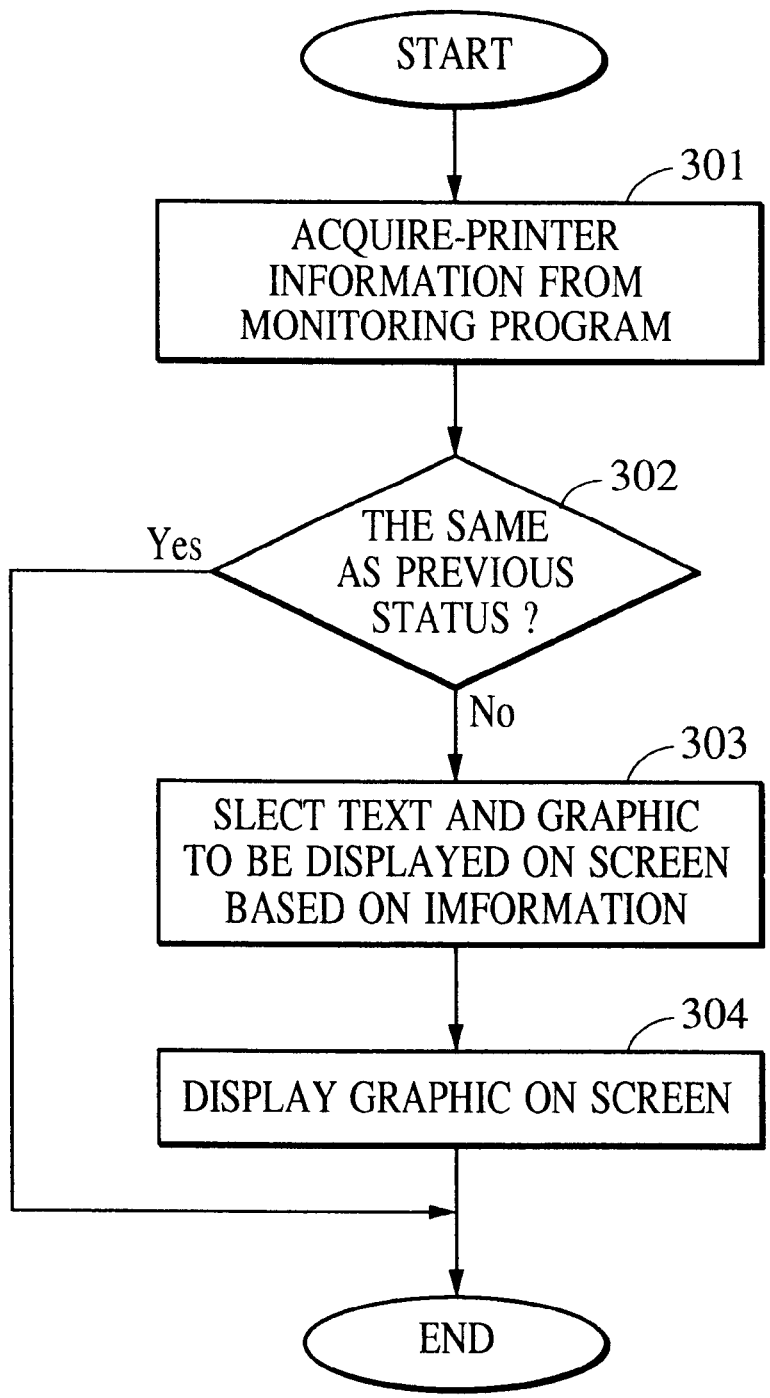
FIG. 3 is a flow diagram showing the process of the embodiment of the present invention.
Figure 4:
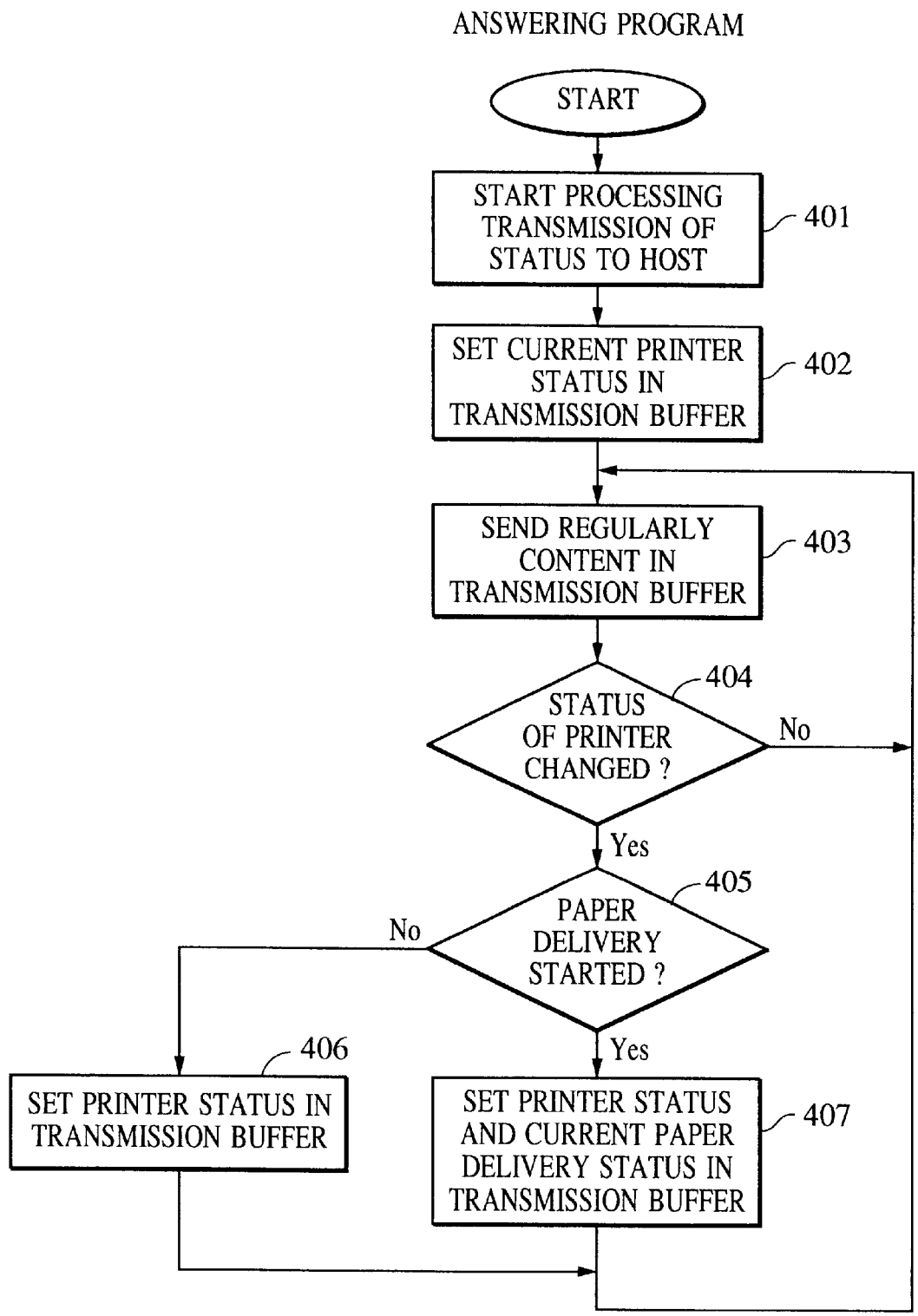
FIG. 4 is a flow diagram showing the process of the embodiment of the present invention.
Figure 8:
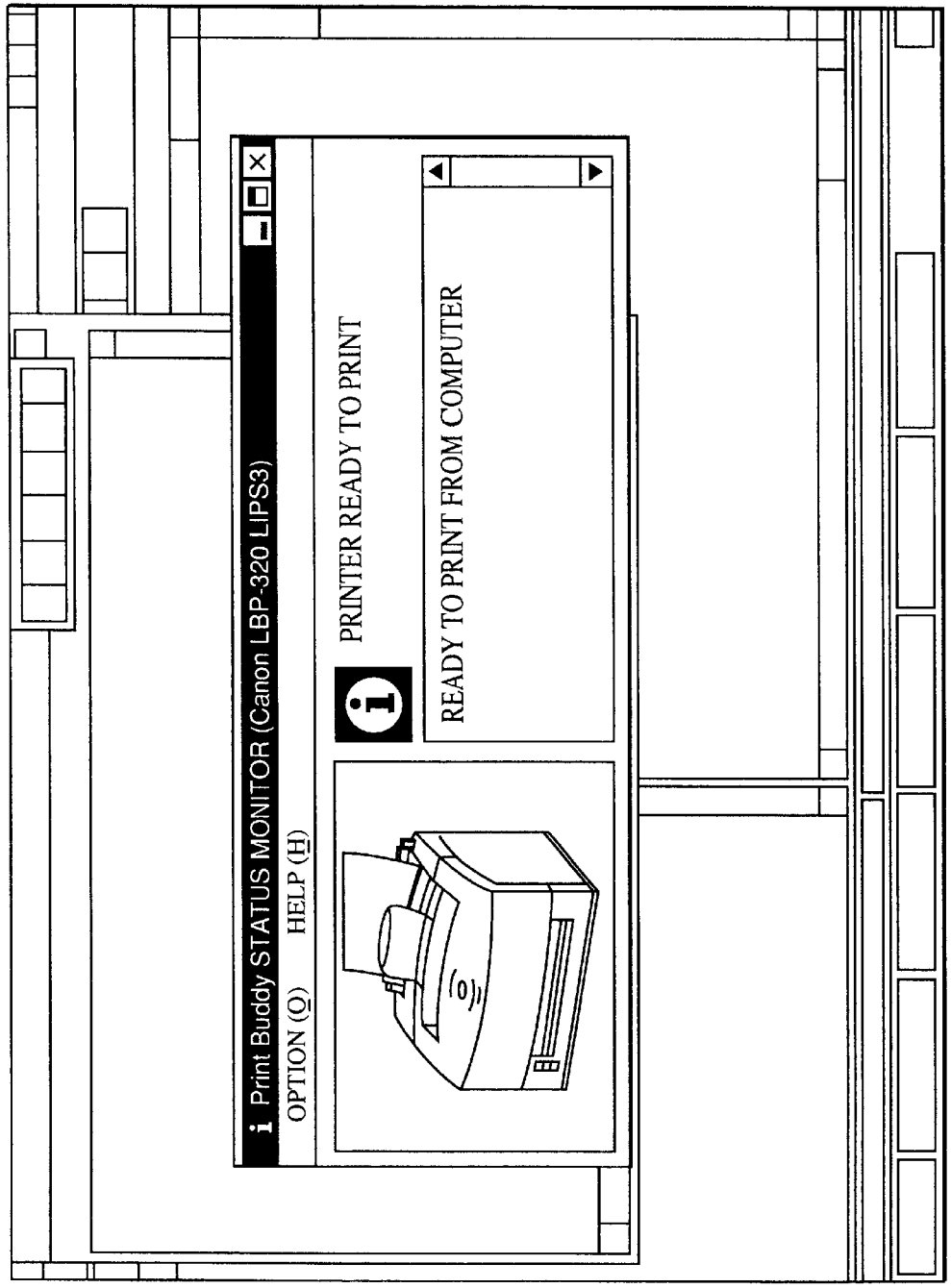
FIG. 8 is an explanatory view showing the process of the embodiment of the present invention.
Figure 9:
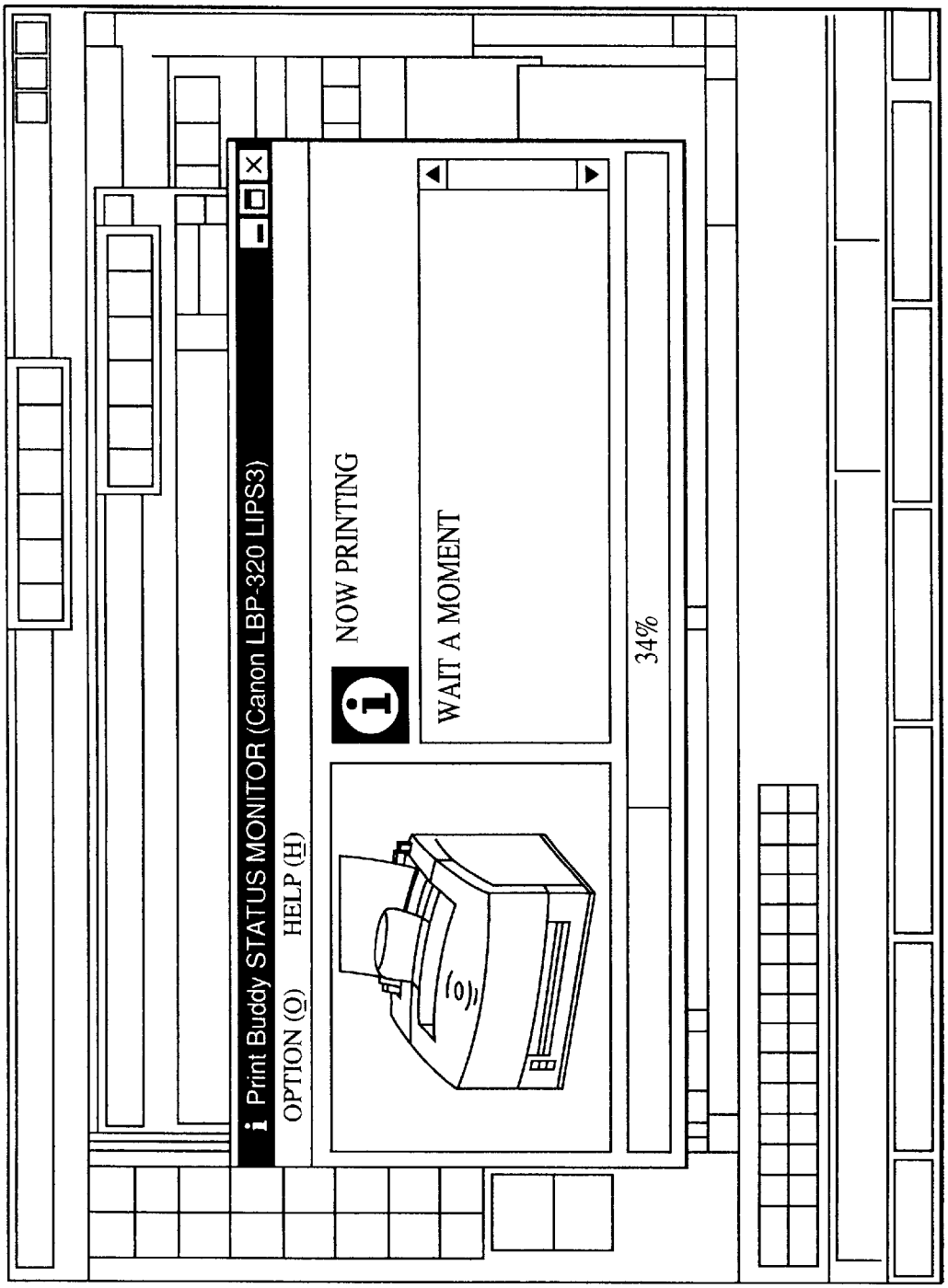
FIG. 9 is an explanatory view showing the process of the embodiment of the present invention.
Figure 10:
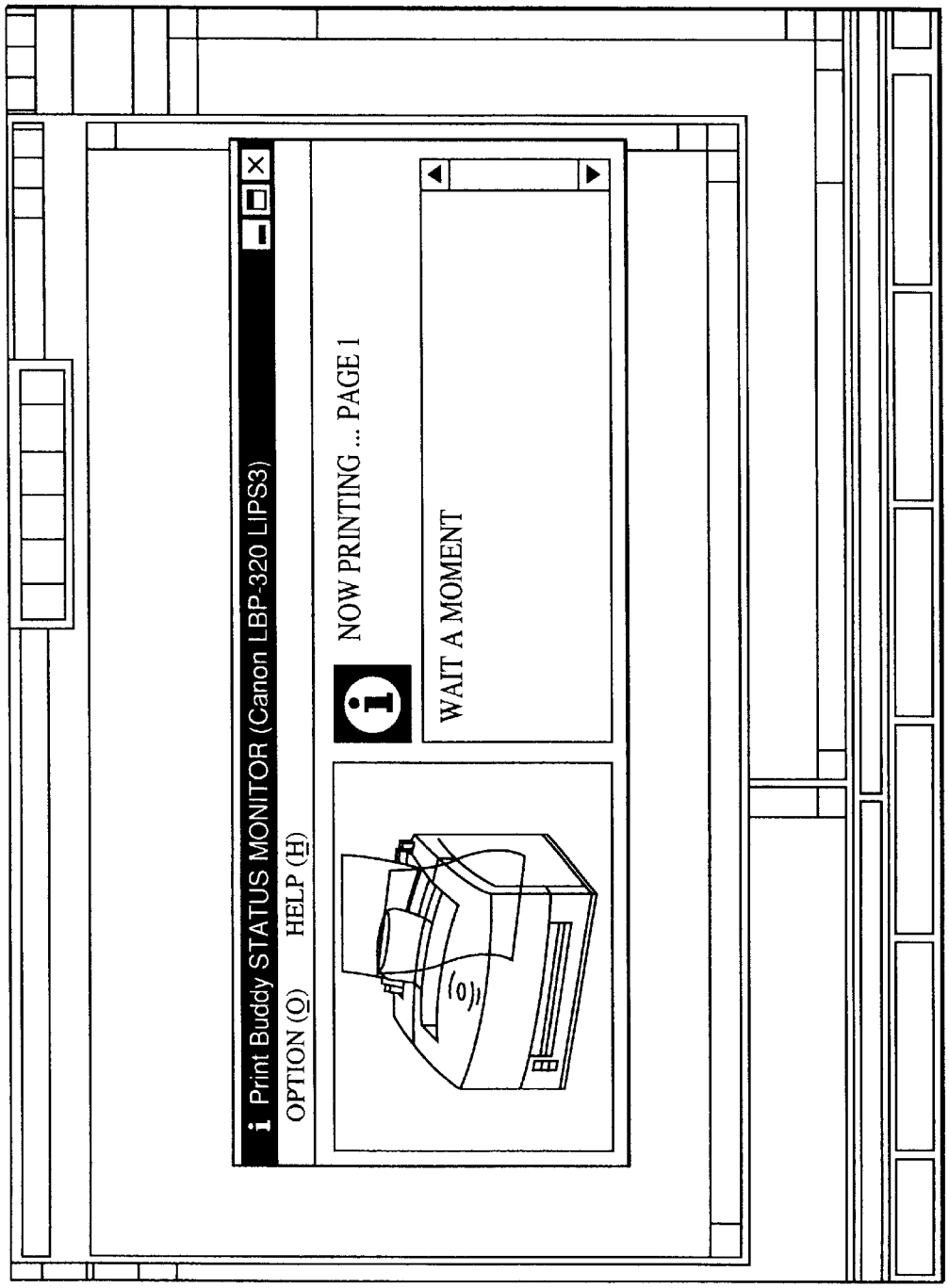
FIG. 10 is an explanatory view showing the process of the embodiment of the present invention.
Figure 11:
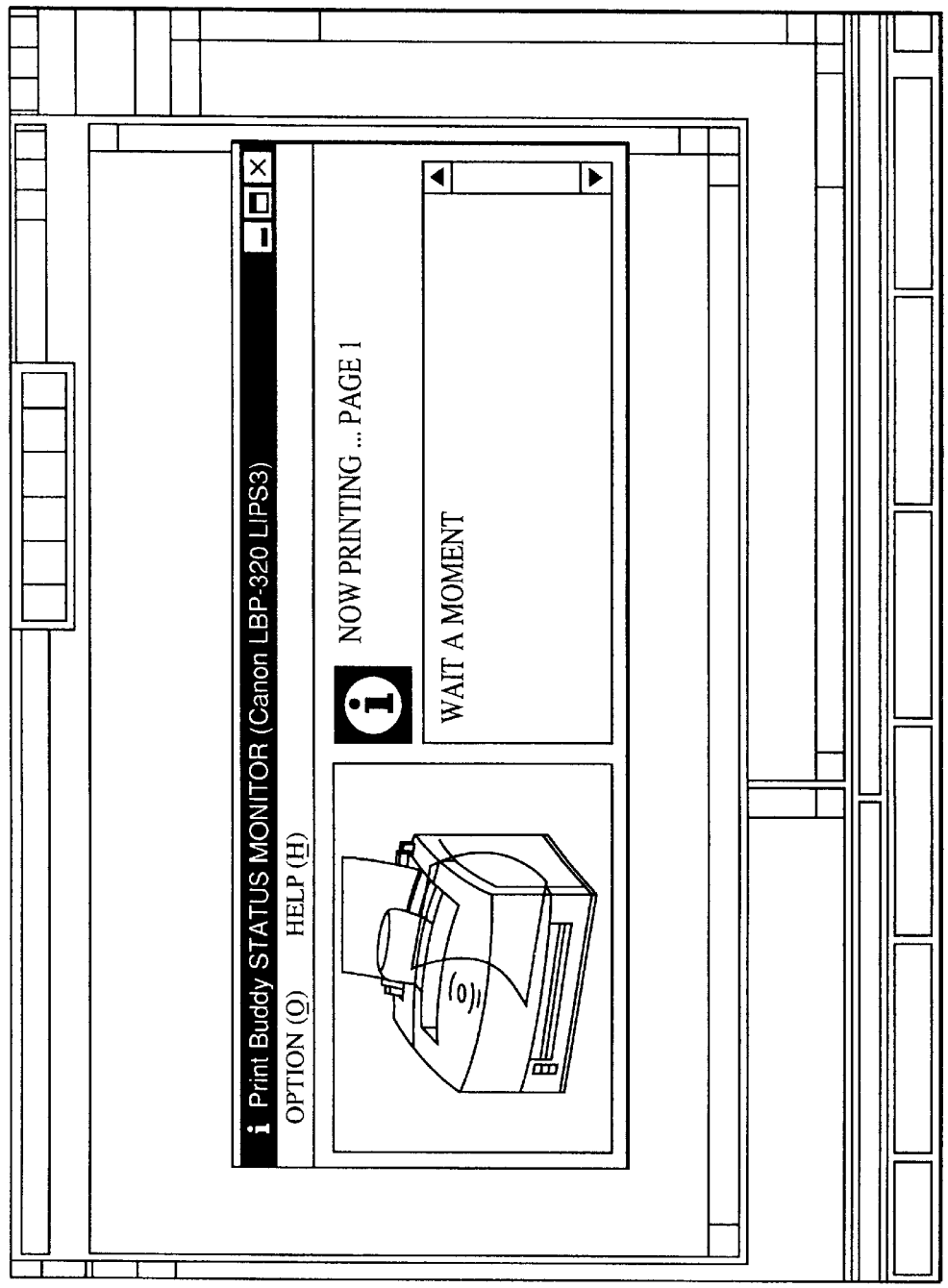
FIG. 11 is an explanatory view showing the process 10 of the embodiment of the present invention.
Figure 12:
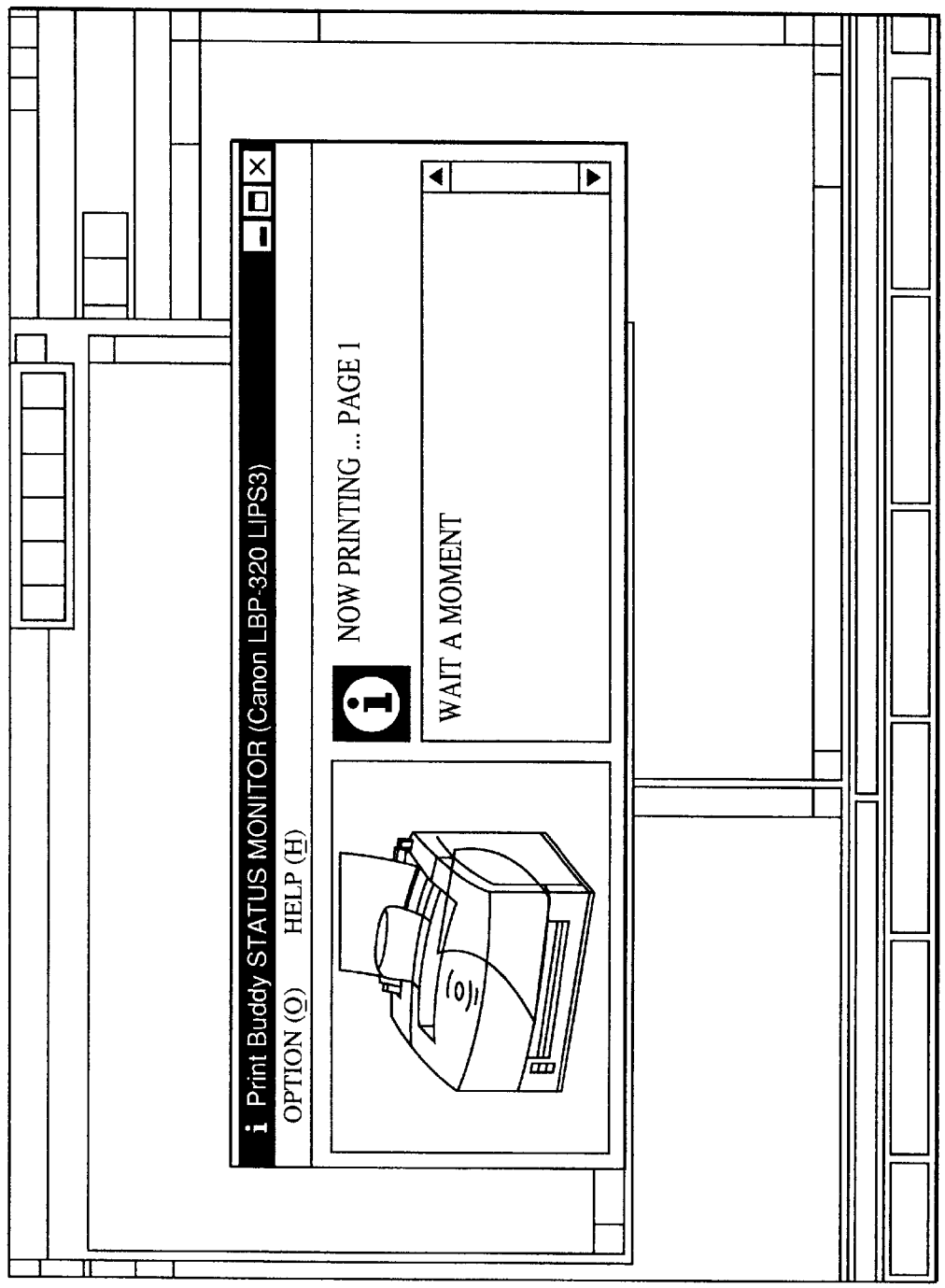
FIG. 12 is an explanatory view showing the process of the embodiment of the present invention.
Figure 13:
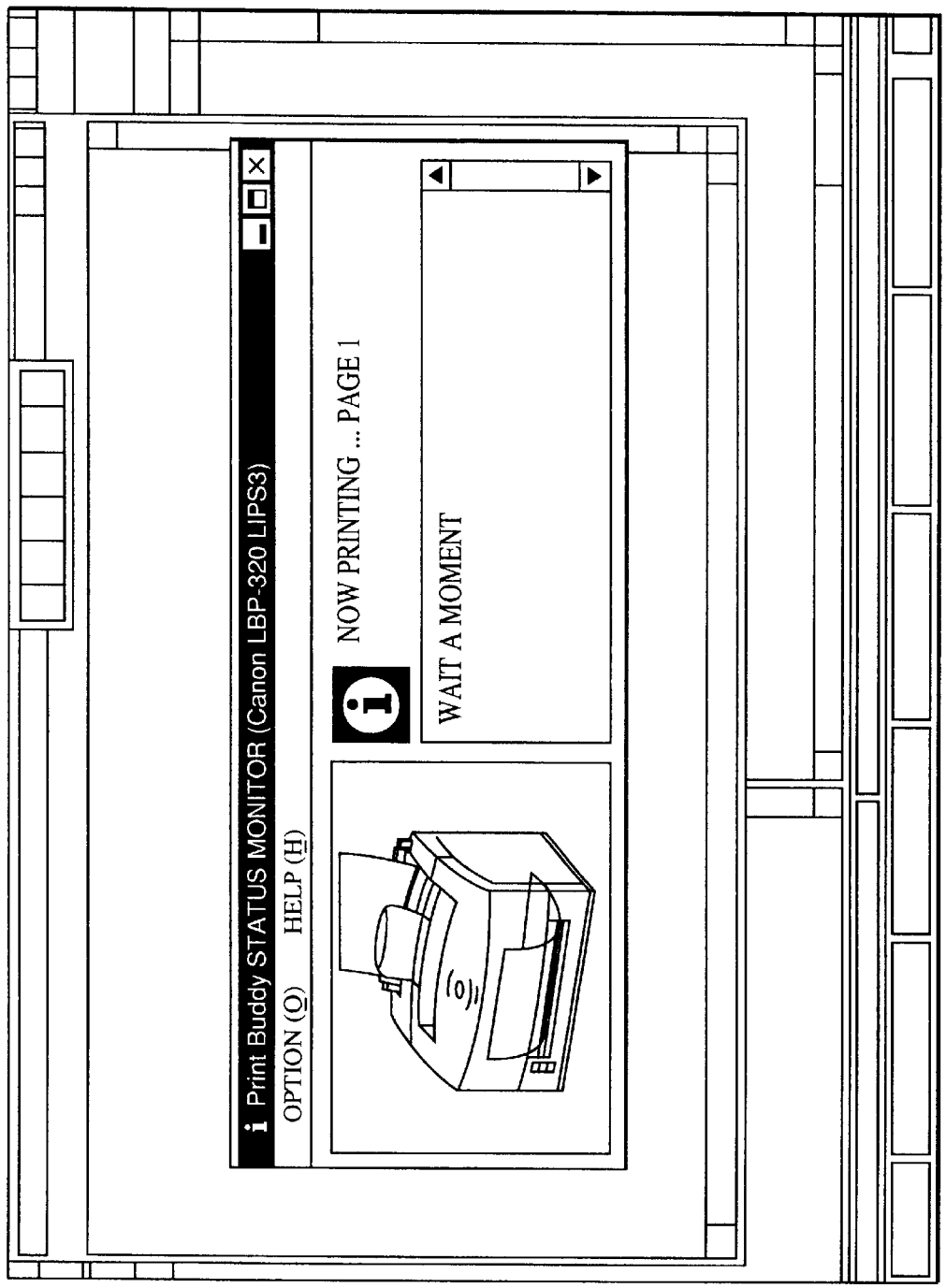
FIG. 13 is an explanatory view showing the process of the embodiment of the present invention.
Figure 14:
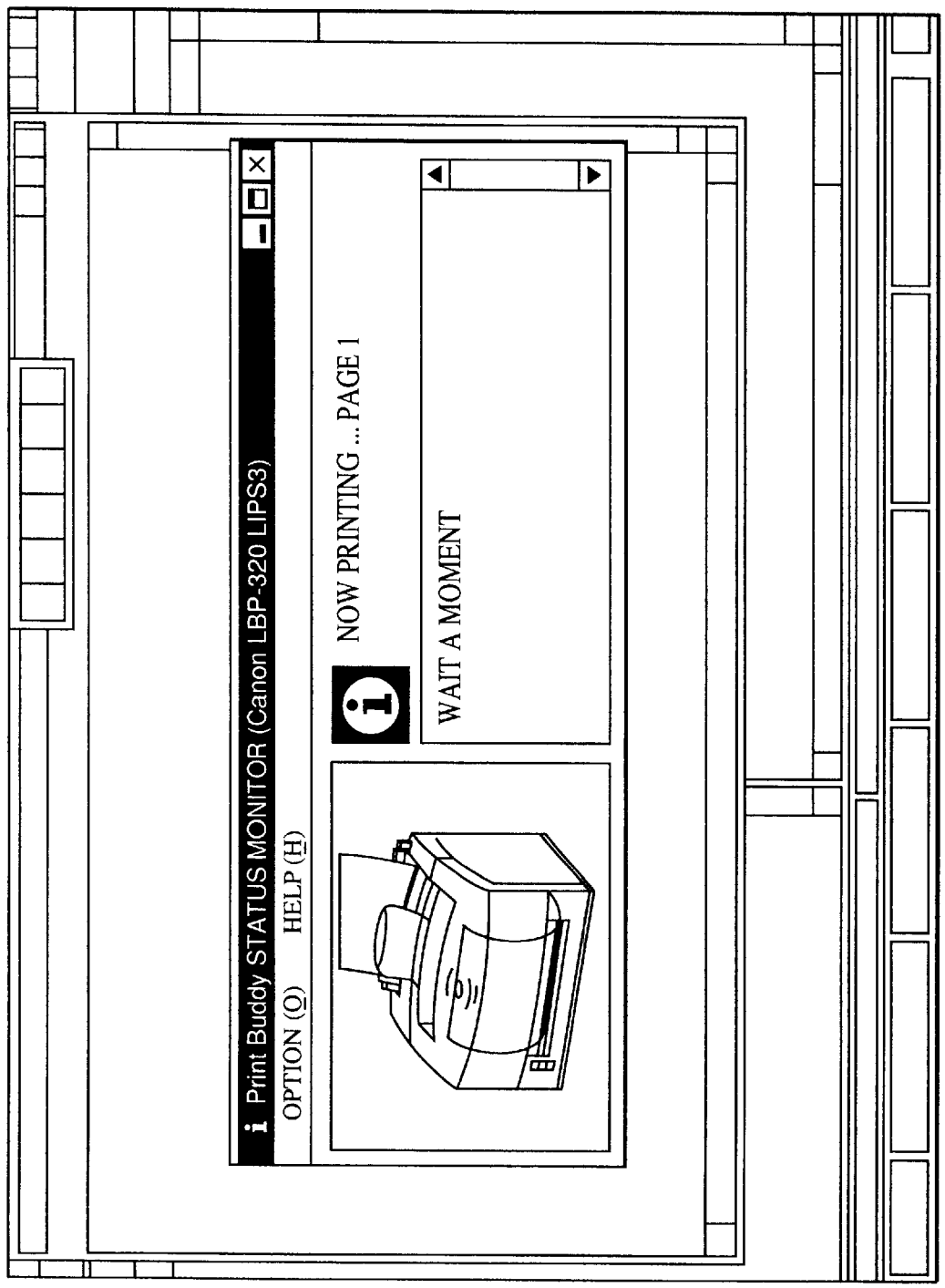
FIG. 14 is an explanatory view showing the process of the embodiment of the present invention.
Figure 15:
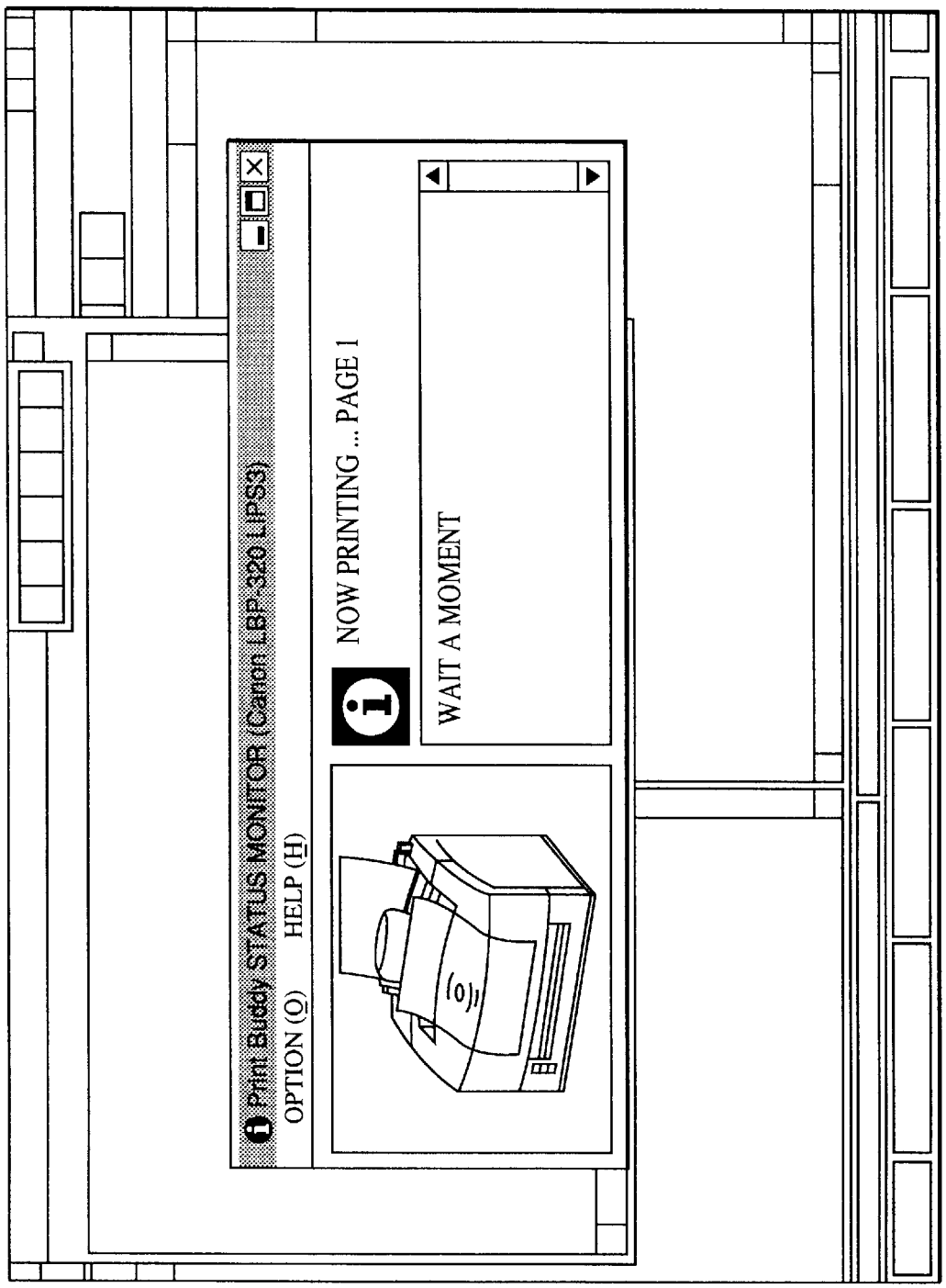
FIG. 15 is an explanatory view showing the process of the embodiment of the present invention.
Figure 16:
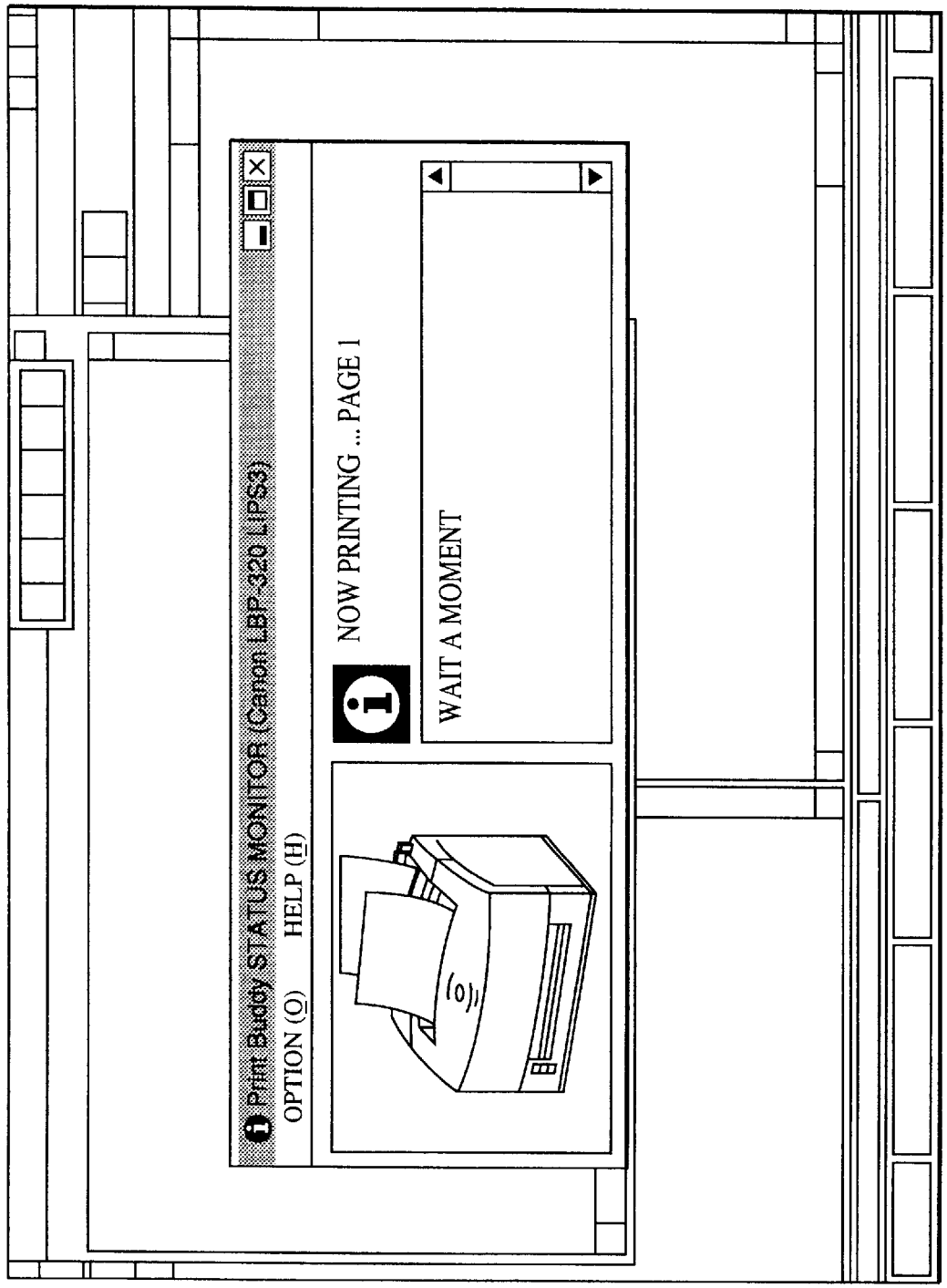
FIG. 16 is an explanatory view showing the process of the embodiment of the present invention.

The control flow of the process in the printer control system thus constructed is discussed referring to flow diagrams shown in FIGS. 2 through 4. FIG. 2 illustrates the process in which the host computer monitors the status of the printer. Prior to sending print data to the printer, the host computer sends a command for setting the printer to report a status when the state in the printer changes (201). When the printer changes its state frequently, the time interval between the transmissions of status is shortened, adversely affecting print data processing. For this reason, the time interval for sending the status to the host computer is set at the same time. Upon receiving this command, the printer performs the process shown in FIG. 4. The printer starts the transmission of the status to the host computer (401) in response to the command requiring the setting of returning the printer status and the command requiring the setting of the time interval of the transmission of the status. The printer sets the status indicative of its current status in a transmission buffer (402). The printer transmits the content in the transmission buffer to the host computer (403). The host computer now knows the printer status prior to printing. The printers determines whether the printer status changed (404). The change in the printer status means that the printer is shifted from on-line ready (standby) state to another state, for example, test printing, data processing, an occurrence of no paper, an occurrence of paper jamming or the like. In this embodiment, the printer is shifted from the standby state to a data reception or data processing because print data is sent from the host computer immediately subsequent to the start of the status transmission. The printers determines whether a paper sheet is delivered (405). Since the delivery of the paper sheet does not start immediately, the process goes to step 406, and a status indicating that the printer is receiving data or processing data is set in the transmission buffer. The process returns to step 403, where the printer transmits the content of the transmission buffer to the host computer at the time interval set by the host computer. When it is determined in step 405 that the paper delivery started, the printer sets, in the transmission buffer, the printer status and a value indicating how much the paper delivery is in progress. The process returns to step 403, where the printer transmits the content of the transmission buffer to the host computer at the time interval set by the host computer. If there is no change in the status in step 404, no step is taken. While no change takes place, the printer transmits the same status as the previously sent one at the timing when the content in the transmission buffer is to be sent. Returning to FIG. 2, the process in the host computer is continuously discussed. After the host computer transmits to the printer the command requiring the setting of the return of the printer status when the printer changes its status (201), the host computer transmits the print data to the printer (202). The host computer counts time for a predetermined constant duration (203). The constant duration is here the time during which the host computer checks to see if the printer has sent the status indicative of the state of the printer, and is set separately from the time interval for the transmission of the printer status. In this embodiment, the time counting duration is predetermined, but may be designed to be optionally set. When the constant duration elapses, the host computer checks to see if the printer has sent a status indicative of the state of the printer (204). The content of the received status is transferred to the control of an animation program for displaying the printer status on the host computer screen (205). Referring to the content of the status acquired in step 204, the host computer determines whether the paper delivery is completed (206). When the paper delivery is not completed, the process returns to step 203. Steps 203–206 are repeated until it is determined in step 206 that the paper delivery is completed. When it is determined in step 206 that the paper delivery is completed, the monitoring program ends. The status transmitted by the printer includes information about the state of the printer, a total number of pages printed, and the length of the paper sheet. The status is a fixed-length ASCII code expressed in a sequence of numbers expressed in 0–9 as shown in FIG. 5. The sequence of numbers is delimited by several digits to express various states. More discussion on this will provided later. The status is written onto the transmission buffer each time the state of the printer changes. For example, when the printer is on ready standby, the status indicative of the standby is written onto the transmission buffer. When the printer is working on a test print, the status is updated to indicate the test print in progress. When it is determined in step 407 in FIG. 4 that the paper delivery starts, the printer transmits to the host computer the status of the printer and, along with it, the percentage value indicating how much the paper delivery operation is in progress. The percentage value is the ratio of the duration from the paper delivery start to the moment the status request command is received to the total time (100%) from the paper delivery start to the end. For example, when a paper sheet takes 10 seconds from its delivery start to end, the printer returns a value of 20% to the host computer at the point 2 seconds later from the delivery start. Although the percentage value may be set at steps of 1%, an approximate measure indicating how much the paper delivery is roughly in progress works. Returning a too detailed value simply increases a load imposed on both the printer and the host computer. The percentage value of the total time for delivering one page may be divided into five or six. When a paper sheet takes 10 seconds for its delivery from start to end with the percentage value divided into five, the printer returns to the host computer a percentage of 20% within a time band extending from 2 seconds or later till 4 seconds, and a percentage value of 40% within a time band from 4 seconds or later till 6 seconds. Since the time required for the delivery of one page of paper sheet varies depending on its sheet size, the time bands and their percentage are also varied, for example, one paper sheet size taking 15 seconds from start to end, results in 20% within a time band from 3 seconds or later till 6 seconds, and 40% within a time band from 6 seconds or later till 9 seconds. The time bands and corresponding percentage values in each sheet are beforehand stored in the printer. The animation program that is called in step 205 in FIG. 2 is now discussed referring to the flow diagram shown in FIG. 3. The animation program displays graphics and characters representing the process of the printer on the host computer screen, and switches the display depending on the progress of the printer processing. Graphics used in this presentation respectively correspond to the statuses. FIGS. 8 through 16 show examples in the windows of status monitors. In step 205 in FIG. 2, the status indicating the state of the printer is transferred. The status includes information about printer states, for example, ready (standby) state, no paper, paper jammed, the difference between ON-LINE and OFF-LINE, the sheet size, and the progress of print data processing indicating standby state and state of data processing. The animation program receives the status including these pieces of information in step 301 in FIG. 3. Comparing it with the previously received one (302), the animation program ends itself if the two statuses are identical, and the host computer returns to the monitoring program (FIG. 2). If the two statuses are different, the animation program references a table that associates the statuses with graphics to be displayed, and selects the graphics to be displayed (303). For example, the image in FIG. 8 is displayed in the on-line ready state (standby), the image in FIG. 9 is displayed when data is being processed, and the image in FIG. 10 is displayed when the status indicative of the detected forward end of paper is received. The graphic is now presented on screen (304). The animation program ends and the host computer returns to the monitor program (FIG. 2). During the paper delivery, of the information of the status, the value indicating the progress of the print data processing is a percentage value that represents how far paper feeding proceeds relative to the entire length of each paper sheet. For example, when six points are set up in the total time required from the start to the end of paper feeding, the printer presents 16%, 33%, 49%, 66%, 82%, and 99%. An application program prepares six graphics corresponding to these percentage values. FIG. 11 shows a 16% progress, FIG. 12 shows a 33% progress, FIG. 13 shows a 49% progress, FIG. 14 shows a 66% progress, FIG. 15 shows a 82% progress, and FIG. 16 shows a 99% progress in the paper feeding process. The host computer optionally sets the number of points representing the degree of progress. The structure of the status is now discussed referring to FIGS. 5 and 6. FIG. 5 shows an actual status. As shown, the status is an ASCII code expressed in a sequence of numbers ranging from 0 to 9. First five bytes are a status called "CJLCODE" to be used to express the printer status. Examples of its content are shown in FIG. 6. For example, "10000" denotes a ready (standby) state, and "10020" denotes a warm-up state. One byte subsequent to the first five bytes is an ON-LINE status, indicating whether the printer is off-line or on-line. "1" denotes ON-LINE while 0 denotes OFF-LINE. Subsequent two bytes are for the sheet size. The length of the paper sheet is expressed in centimeters. FIG. 6 lists the sheet sizes and their corresponding status values.

Subsequent two bytes are a status called "SUB-STATUS", indicating data reception/processing, paper feeding, printing, paper transport elapsed time, and the like. FIG. 6 lists the numbers and their contents. When the number is within 05 and 99, it represents the elapsed time in percentage from the start to the end of the paper delivery. Subsequent three bytes are "PAGE-COUNT", indicating least three digits of a total number of pages printed by the printer. This number is incremented at "SUB-STATUS" at 04, namely when the printer detects the forward end of the paper. The host computer stores "PAGE-COUNT" of the status that is received when the printer is idling, and by subtracting the "PAGE-COUNT" stored during the idling from the "PAGE-COUNT" of the status received after the start of the paper delivery, the host computer displays what page is being delivered. Last three bytes are reserved for a possible status expansion. When the host computer requests the printer to send the status, the printer set these statuses to be sent to the host computer. FIGS. 5(1)–5(11) show the change in status from the on-line ready (standby) state to print data reception to the end of paper delivery. Cross-references with FIGS. 8 through 16 are also listed.

Second Embodiment

In the above embodiment, the case in which paper sheets are delivered in succession has not been discussed. When paper sheets are delivered in succession, the percentage value of delivery starts for a next page even if the delivery of a preceding paper sheet has yet to reach 99%. In this way, an updated paper delivery situation is always acquired.

Third Embodiment

In the above embodiment, the paper delivery situation is presented in animation. It is also possible to notify the user of the printer status by displaying a picture and descriptive text on screen.

Fourth Embodiment

When there is no need for recognizing the printer state on screen, the transmission of the printer status and displaying of the animation are disabled.

Referring to FIG. 7, data processing programs are discussed.

FIG. 7 is a memory map of a storage medium that stores various data processing programs read by an image forming apparatus of the present invention and by an apparatus to which the image forming apparatus is connected.

The information that manages a group of programs stored in the storage medium, for example, information about the version of a program and the name of a programmer, is also stored, and information depending on the operating system of the program reader side, for example, an icon identifying each program, may be also stored.

Data under the control of each program is also managed in a directory. A program for installing each program into the computer and a decompression program for compressing a compressed installation program may also be stored.

The functions shown in FIGS. 2 through 6 may be performed under the program installed into the host computer. The present invention may be implemented when a group of information including programs are supplied to the image forming apparatus from a storage medium such as a CD-ROM, a flash memory, or a floppy disk, or from an outside storage medium via a network.

The storage medium holding a program code of software for carrying out the functions of the embodiments is loaded in a system or apparatus. The computer (CPU or MPU) of the system or apparatus reads the program code stored in the storage medium to execute the program. The objects of the present invention are thus achieved.

The program code read from the storage medium performs the novel functions of the present invention, and the storage medium storing the program code constitutes the present invention.

Available as storage media for feeding the program code are floppy disk, hard disk, optical disk, magneto-optic disk, CD-ROM, CD-R, magnetic tape, non-volatile memory card, ROM, EEPROM and the like.

By executing the program code read by the computer, the functions of the embodiments are performed. Furthermore, the OS running on the computer performs partly or entirely an actual process according to the instruction of the program code, and the functions of the embodiments are thus performed.

According to the present invention, the transmitter side of data can know the process in progress in the image forming apparatus even when the image forming apparatus forms a visible image of received data, and presents an animation representing the paper delivery situation. The host computer monitors the paper delivery from its start, presenting no discrepancy between the animation of paper delivery and the actual progress of paper delivery and thereby keeping the user informed of accurate information.

What is claimed is:

1. An output control apparatus that bilaterally communicates with an output apparatus, said output control apparatus comprising:
   a reception unit adapted to receive data, which indicates that a status of the output apparatus has changed, a plurality of times during printing of a page; and
   a control unit adapted to control animation to simulate transport of a paper sheet, based on the data received by said reception unit,
   wherein the data received by said reception unit includes information indicating a predetermined ratio regarding delivery of a page, and
   wherein the animation is controlled such that a picture is selected based on the information included in the data received by said reception unit a plurality of times during printing of the page.

2. An output control apparatus according to claim 1, further comprising:
   an animation unit adapted to display picture animation,
   wherein said control unit controls a start and an end of the picture animation displayed by said animation unit.

3. An output control apparatus according to claim 2, further comprising:
   a detection unit adapted to detect a position of a paper sheet being delivered, among usable paper sheets, in order to detect a change in the status of the output apparatus,
   wherein the picture animation displayed by said animation unit simulates transport of a paper sheet, based on the position of the paper sheet being delivered detected by said detection unit.

4. An output control apparatus according to claim 2, further comprising:
   a transmission unit connected to the output apparatus, said transmission unit adapted to transmit image data to the output apparatus;
   an analysis unit adapted to analyze the data received by said reception unit;
   a storage unit adapted to store an image, including figures and characters, indicating an analysis result of said analysis unit; and
   a correspondence unit adapted to determine a correspondence between information analyzed by said analysis unit and the image store by said storage unit,
   wherein said animation unit displays an image selected by said correspondence unit.

5. An output control apparatus according to claim 1, further comprising:
   a bilateral communication unit adapted to communicate a command to the output apparatus to return a status when the status of the output apparatus has changed, and to communicate a command to control a timing for returning the status to said output control apparatus.

6. An output control apparatus according to claim 1, wherein a status during data reception and processing of data are stored in a status region of the data received by said reception unit, and the information indicating the predetermined ratio is stored in the status region of the data received by said reception unit.

7. An output control method of an output control apparatus that bilaterally communicates with an output apparatus, said method comprising:
   a reception step of receiving data, which indicates that a status of the output apparatus has changed, a plurality of times during printing of a page; and
   a control step of controlling animation to simulate transport of a paper sheet, based on the data received in said reception step,
   wherein the data received in said reception step includes information indicating a predetermined ratio regarding delivery of a page, and
   wherein the animation is controlled such that a picture is selected based on the information included in the data received in said reception step a plurality of times during printing of the page.

8. An output control method according to claim 7, further comprising:
   an animation step of displaying picture animation,
   wherein said control step includes controlling a start and an end of the picture animation displayed in said animation step.

9. An output control method according to claim 8, further comprising:
   a detection step of detecting a position of a paper sheet being delivered, among usable paper sheets, in order to detect a change in the status of the output apparatus,
   wherein the picture animation displayed in said animation step simulates transport of a paper sheet, based on the position of the paper sheet being delivered detected in said detection step.

10. An output control method according to claim 8, further comprising:
   a transmission step of transmitting image data to the output apparatus;
   an analysis step of analyzing the data received in said reception step;
   a storage step of storing an image, including figures and characters, indicating an analysis result of said analysis step; and
   a correspondence step of determining a correspondence between information analyzed in said analysis step and the image store in said storage step,
   wherein said animation step displays an image selected in said correspondence step.

11. An output control method according to claim 7, further comprising:
   a bilateral communication step of communicating a command to the output apparatus to return a status when the status of the output apparatus has changed, and of communicating a command to control a timing for returning the status to the output control apparatus.

12. An output control method according to claim 7, wherein a status during data reception and processing of data are stored in a status region of the data received in said reception step, and the information indicating the predetermined ratio is stored in the status region of the data received in said reception step.

13. A computer-readable storage medium storing a program for implementing an output control method of an output control apparatus that bilaterally communicates with an output apparatus, the program comprising:
   program code for a reception step of receiving data, which indicates that a status of the output apparatus has changed, a plurality of times during printing of a page; and
   program code for a control step of controlling animation to simulate transport of a paper sheet, based on the data received in the reception step,
   wherein the data received in the reception step includes information indicating a predetermined ratio regarding delivery of a page, and
   wherein the animation is controlled such that a picture is selected based on the information included in the data received in the reception step a plurality of times during printing of the page.

14. A storage medium according to claim 13, wherein the program further comprises:
   program code for an animation step of displaying picture animation,
   wherein the control step includes controlling a start and an end of the picture animation displayed in the animation step.

15. A storage medium according to claim 14, wherein the program further comprises:
   program code for a detection step of detecting a position of a paper sheet being delivered, among usable paper sheets, in order to detect a change in the status of the output apparatus,
   wherein the picture animation displayed in the animation step simulates transport of a paper sheet, based on the position of the paper sheet being delivered detected in the detection step.

16. A storage medium according to claim 14, wherein the program further comprises:
   program code for a transmission step of transmitting image data to the output apparatus;
   program code for an analysis step of analyzing the data received in the reception step;
   program code for a storage step of storing an image, including figures and characters, indicating an analysis result of the analysis step; and
   program code for a correspondence step of determining a correspondence between information analyzed in the analysis step and the image store in the storage step,
   wherein the animation step displays an image selected in the correspondence step.

17. A storage medium according to claim 13, wherein the program further comprises:
   program code for a bilateral communication step of communicating a command to the output apparatus to return a status when the status of the output apparatus has changed, and of communicating a command to control a timing for returning the status to the output control apparatus.

18. A storage medium according to claim 13, wherein a status during data reception and processing of data are stored in a status region of the data received in the reception step, and the information indicating the predetermined ratio is stored in the status region of the data received in the reception step.

19. A program product embodying a computer program for implementing an output control method of an output control apparatus that bilaterally communicates with an output apparatus, said program product comprising:
   program code for a reception step of receiving data, which indicates that a status of the output apparatus has changed, a plurality of times during printing of a page; and
   program code for a control step of controlling animation to simulate transport of a paper sheet, based on the data received in the reception step,
   wherein the data received in the reception step includes information indicating a predetermined ratio regarding delivery of a page, and
   wherein the animation is controlled such that a picture is selected based on the information included in the data received in the reception step a plurality of times during printing of the page.

20. A program product according to claim 19, further comprising:
   program code for an animation step of displaying picture animation,
   wherein the control step includes controlling a start and an end of the picture animation displayed in the animation step.

21. A program product according to claim 20, further comprising:
   program code for a detection step of detecting a position of a paper sheet being delivered, among usable paper sheets, in order to detect a change in the status of the output apparatus, wherein the picture animation displayed in the animation step simulates transport of a paper sheet, based on the position of the paper sheet being delivered detected in the detection step.

22. A program product according to claim 20, further comprising:

program code for a transmission step of transmitting image data to the output apparatus;

program code for an analysis step of analyzing the data received in the reception step;

program code for a storage step of storing an image, including figures and characters, indicating an analysis result of the analysis step; and program code for a correspondence step of determining a correspondence between information analyzed in the analysis step and the image store in the storage step, wherein the animation step displays an image selected in the correspondence step.

23. A program product according to claim 19, further comprising:

program code for a bilateral communication step of communicating a command to the output apparatus to return a status when the status of the output apparatus has changed, and of communicating a command to control a timing for returning the status to the output control apparatus.

24. A program product according to claim 19, wherein a status during data reception and processing of data are stored in a status region of the data received in the reception step, and the information indicating the predetermined ratio is stored in the status region of the data received in the reception step.

* * * * *

UNITED STATES PATENT AND TRADEMARK OFFICE
CERTIFICATE OF CORRECTION

PATENT NO.    : 6,486,968 B2
DATED         : November 26, 2002
INVENTOR(S)   : Yoko Nishikawa It is certified that error appears in the above-identified patent and that said Letters Patent is hereby corrected as shown below:

Title page,
Insert Item -- [65] -- before "Prior Publication Data".
Item [57], ABSTRACT,
Line 3, "paper" should read -- paper sheet --.

Drawings,
SHEET 3, Fig. 3, "SLECT" should read -- SELECT --
SHEET 7, Fig. 7, "RASTERZING" should read -- RASTERIZING --.

Column 2,
Line 38, "a" should read -- an --.

Column 3,
Line 28, "anther" should read -- another --.
Line 42, "simulate" should read -- simulates --.

Column 6,
Line 14, "printers" should read -- printer --.
Line 56, "The" should read -- ¶ The --.
Line 62, "will" should read -- will be --.

Column 8,
Line 38, "set" should read -- sets --.

Column 10,
Line 29, "store" should read -- stored --.

Column 11,
Line 22, "store" should read -- stored --.

UNITED STATES PATENT AND TRADEMARK OFFICE
CERTIFICATE OF CORRECTION

PATENT NO. : 6,486,968 B2
DATED : November 26, 2002
INVENTOR(S) : Yoko Nishikawa It is certified that error appears in the above-identified patent and that said Letters Patent is hereby corrected as shown below:

Column 12,
Line 19, "store" should read -- stored --.

Signed and Sealed this

Nineteenth Day of August, 2003

JAMES E. ROGAN
*Director of the United States Patent and Trademark Office*